United States Patent
Adiletta et al.

(10) Patent No.: US 7,552,427 B2
(45) Date of Patent: Jun. 23, 2009

(54) METHOD AND APPARATUS FOR IMPLEMENTING A BI-ENDIAN CAPABLE COMPILER

(75) Inventors: Matthew J Adiletta, Bolton, MA (US); Hugh Wilkinson, Newton, MA (US); Robert J Kushlis, Worcester, MA (US)

(73) Assignee: Intel Corporation, Santa Clara, CA (US)

(*) Notice: Subject to any disclaimer, the term of this patent is extended or adjusted under 35 U.S.C. 154(b) by 900 days.

(21) Appl. No.: 11/010,490

(22) Filed: Dec. 13, 2004

(65) Prior Publication Data

US 2006/0125663 A1 Jun. 15, 2006

(51) Int. Cl.
*G06F 9/45* (2006.01)

(52) U.S. Cl. ..................................................... 717/140
(58) Field of Classification Search .................. 717/140
See application file for complete search history.

(56) References Cited

U.S. PATENT DOCUMENTS

| | | | |
|---|---|---|---|
| 5,630,085 A * | 5/1997 | Watanabe ................... 712/207 |
| 5,781,763 A * | 7/1998 | Beukema et al. .............. 710/22 |
| 5,828,884 A * | 10/1998 | Lee et al. ..................... 717/141 |
| 6,411,395 B1 * | 6/2002 | Bahrs et al. ................ 358/1.15 |
| 6,578,193 B1 | 6/2003 | Adams |
| 6,687,262 B1 * | 2/2004 | Jin et al. ..................... 370/476 |
| 6,895,489 B2 * | 5/2005 | Qureshi et al. .............. 711/202 |
| 7,389,315 B1 * | 6/2008 | Scott .......................... 707/205 |
| 2003/0028866 A1 | 2/2003 | Long |
| 2004/0221274 A1 | 11/2004 | Bross et al. |
| 2005/0066146 A1 * | 3/2005 | Barry et al. ................. 711/201 |
| 2005/0097127 A1 * | 5/2005 | Foley ..................... 707/103 Y |

FOREIGN PATENT DOCUMENTS

WO    WO-2006065689 A1    6/2006

* cited by examiner

Primary Examiner—John Chavis
(74) Attorney, Agent, or Firm—L. Cho

(57) ABSTRACT

A method of compiling code includes assigning an endian type to data. An endian flip operation is performed based on the endian type of the data and a target system. Other embodiments are described and claimed.

20 Claims, 7 Drawing Sheets

METHOD AND APPARATUS FOR IMPLEMENTING A BI-ENDIAN CAPABLE COMPILER

FIELD

An embodiment of the present invention relates to compilers. More specifically, an embodiment of the present invention relates to a method and apparatus for implementing a bi-endian capable compiler.

BACKGROUND

Byte endianess is an attribute of data storage and retrieval where the data storage and data retrieval support multiple access sizes. Finer granularity accesses allow a programmer to see the order in which the larger accesses store bytes in memory. Big endian data are stored in memory in opposite byte order from little endian data. Little endian data are stored with its least significant byte in the lowest memory byte address (storing left to right). Big endian data are stored with its most significant byte in the lowest memory byte address (storing right to left). Big and little endian variables having the same value are identical in CPU registers, but have differing order in memory.

Source code that is written using one byte endianess convention cannot be executed on a platform or target system that is of another byte endianess convention without recognizing the differing order of how some of the data is stored in memory. For example, in order to preserve correct software behavior, an endian byte ordering within data must be preserved when a union or pointer access might make such order visible to the programmer. Byte order for data written or read from beyond the scope of the program must also be preserved.

In the past, some platforms were configured with a mode bit that could be set to support the execution of source code written in one byte endian convention or the other. This approach, however, applied the support to all code running on the platform and thus did not address the problem of running a big endian program on a little endian operating system.

Thus, what is needed is an efficient and effective method and apparatus for executing code written in one endianess convention on a computer system platform of a differing endianess convention.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. However, it will be apparent to one skilled in the art that specific details in the description may not be required to practice the embodiments of the present invention. In other instances, well-known components, programs, and procedures are shown in block diagram form to avoid obscuring embodiments of the present invention unnecessarily.

Figure 1:
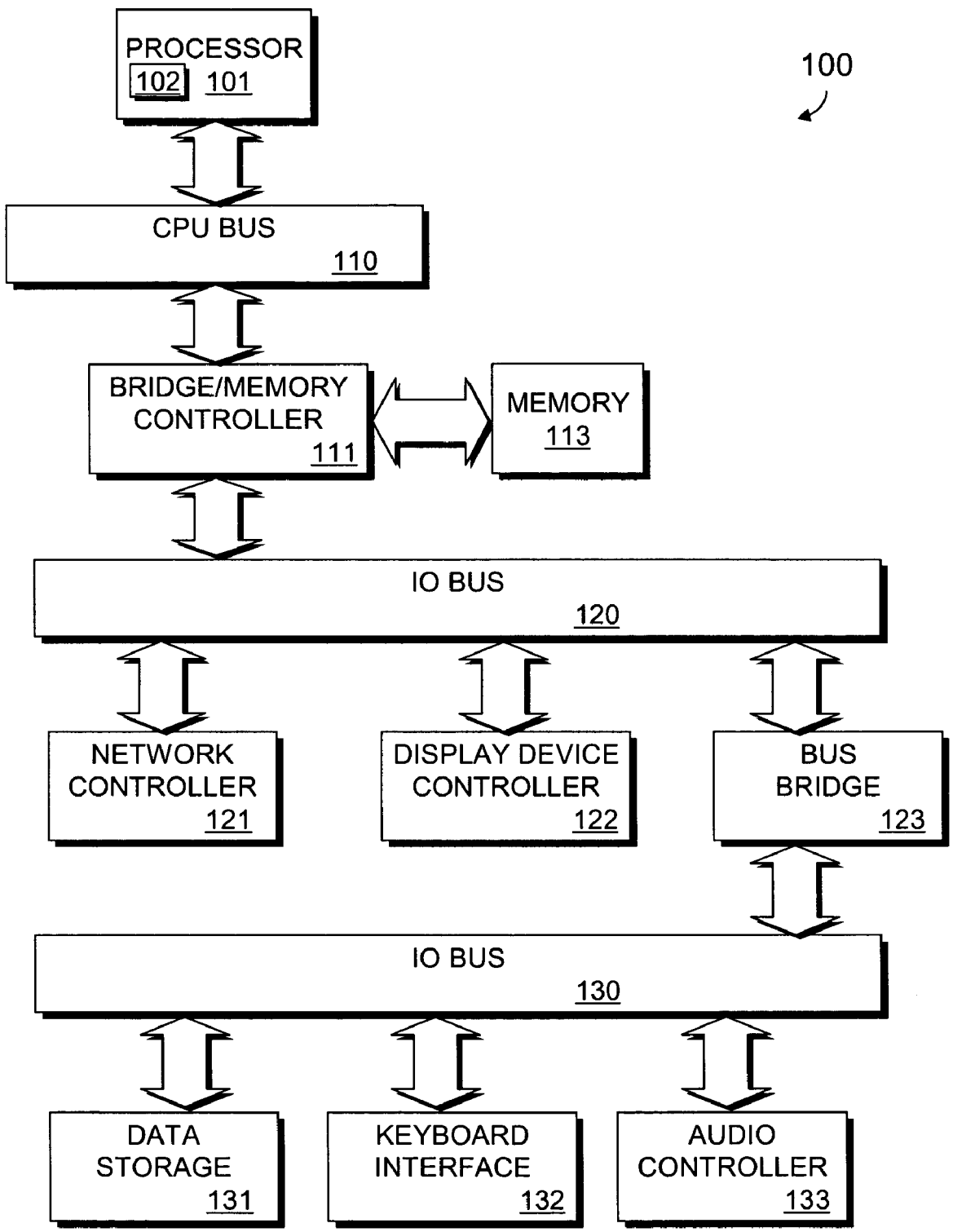
FIG. 1 is a block diagram of an exemplary computer system in which an embodiment of the present invention may be implemented.

FIG. 1 is a block diagram of an exemplary computer system 100 according to an embodiment of the present invention. The computer system 100 includes a processor 101 that processes data signals and a memory 113. The computer system 100 may be of a big endian or little endian type where the processor 101 either stores the low-order byte of a number at the lowest address and the high-order byte of a number at the highest address (little endian convention) or stores the high-order byte of the number at the lowest address and the low-order byte at the highest address (big endian convention).

The processor 101 may be a complex instruction set computer microprocessor, a reduce instruction set computing microprocessor, a very long instruction word microprocessor, a processor implementing a combination of instruction sets, or other processor device. FIG. 1 shows the computer system 100 with a single processor. However, it is understood that the computer system 100 may operate with multiple processors. Additionally, each of the one or more processors may support one or more hardware threads. The processor 101 is coupled to a CPU bus 110 that transmits data signals between processor 101 and other components in the computer system 100.

The memory 113 may be a dynamic random access memory device, a static random access memory device, read-only memory, and/or other memory device. The memory 113 may store instructions and code represented by data signals that may be executed by the processor 101. According to an example embodiment of the computer system 100, a bi-endian capable compiler may be stored in the memory 113 and implemented by the processor 101 in the computer system 100 to provide bi-endian support when compiling software. Data that would normally be stored in little endian order in the memory 113 may be stored in big endian order, and vice versa, by performing an endian flip (byte swap) operation prior to the store. This value may be retrieved by performing an endian flip operation after the retrieval from the memory 113. It should be appreciated that endian flip operations may be performed prior to writing the data (pre-write) and after reading the data (post-read) for aligned and unaligned references. Endian flip operations may be implemented using a separate instruction, a separate machine operation, or a side effect of a particular load or store operation.

A cache memory 102 resides inside processor 101 that stores data signals stored in memory 113. The cache 102 speeds access to memory by the processor 101 by taking advantage of its locality of access. In an alternate embodiment of the computer system 100, the cache 102 resides external to the processor 101. A bridge memory controller 111 is coupled to the CPU bus 110 and the memory 113. The bridge memory controller 111 directs data signals between the processor 101, the memory 113, and other components in the computer system 100 and bridges the data signals between the CPU bus 110, the memory 113, and a first IO bus 120.

The first IO bus 120 may be a single bus or a combination of multiple buses. The first IO bus 120 provides communication links between components in the computer system 100. A network controller 121 is coupled to the first IO bus 120. The network controller 121 may link the computer system 100 to a network of computers (not shown) and supports communication among the machines. A display device controller 122 is coupled to the first IO bus 120. The display device controller 122 allows coupling of a display device (not shown) to the computer system 100 and acts as an interface between the display device and the computer system 100.

A second IO bus 130 may be a single bus or a combination of multiple buses. The second IO bus 130 provides communication links between components in the computer system 100. A data storage device 131 is coupled to the second IO bus 130. The data storage device 131 may be a hard disk drive, a floppy disk drive, a CD-ROM device, a flash memory device or other mass storage device. An input interface 132 is coupled to the second IO bus 130. The input interface 132 may be, for example, a keyboard and/or mouse controller or other input interface. The input interface 132 may be a dedicated device or can reside in another device such as a bus controller or other controller. The input interface 132 allows coupling of an input device to the computer system 100 and transmits data signals from an input device to the computer system 100. An audio controller 133 is coupled to the second IO bus 130. The audio controller 133 operates to coordinate the recording and playing of sounds and is also coupled to the IO bus 130. A bus bridge 123 couples the first IO bus 120 to the second IO bus 130. The bus bridge 123 operates to buffer and bridge data signals between the first IO bus 120 and the second 10 bus 130.

Figure 2:
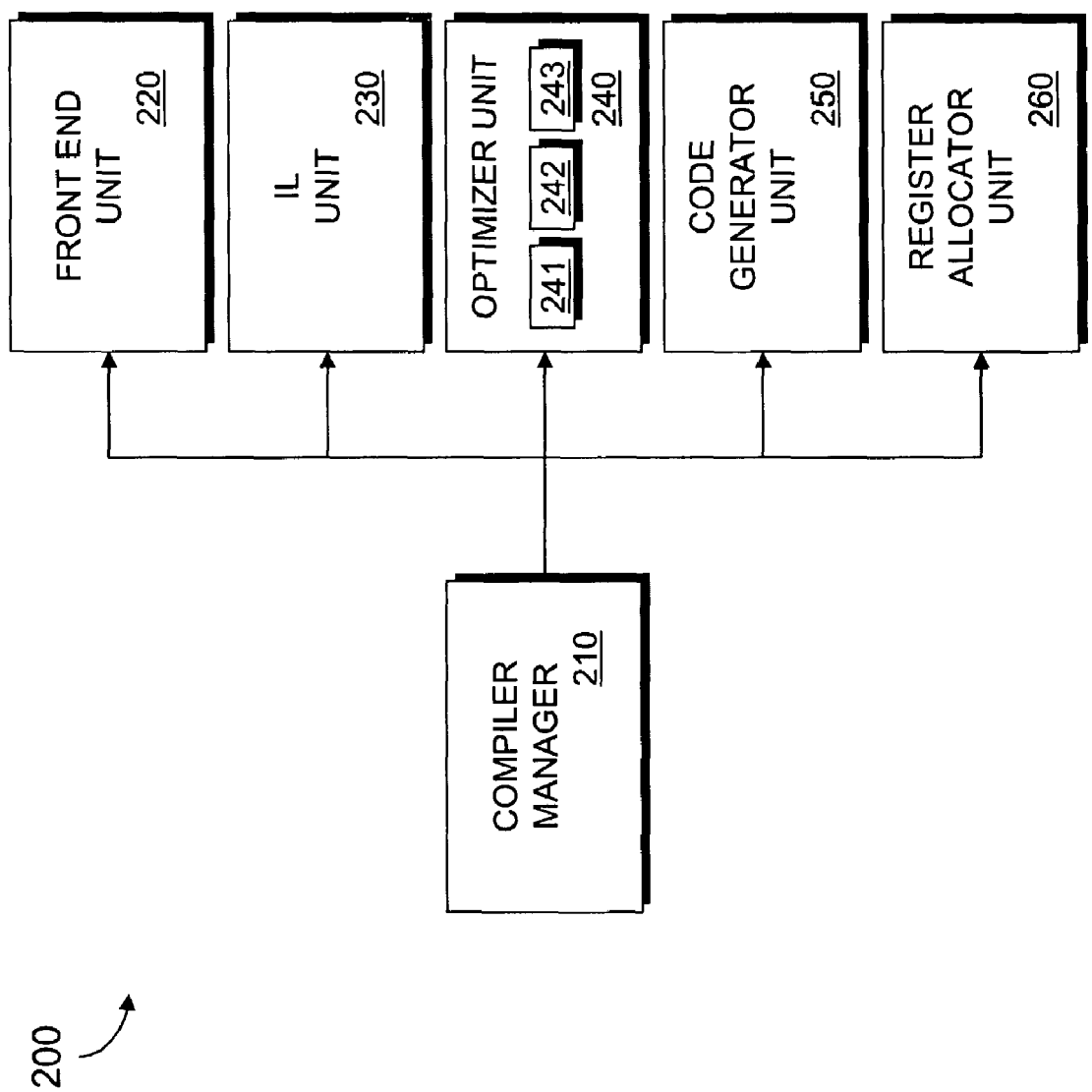
FIG. 2 is a block diagram that illustrates a bi-endian capable compiler according to an example embodiment of the present invention.

FIG. 2 is a block diagram that illustrates a bi-endian capable compiler 200 according to an example embodiment of the present invention. The bi-endian capable compiler 200 includes a compiler manager 210. The compiler manager 210 receives source code to compile. The compiler manager 210 interfaces with and transmits information between other components in the bi-endian capable compiler 200.

The bi-endian capable compiler 200 includes a front end unit 220. According to an embodiment of the bi-endian capable compiler 200, the front end unit 220 operates to parse source code and convert it to an abstract syntax tree. The front end unit 220 may also assign an endian type to data in the source code. According to a first embodiment of the front end unit 220, a characteristic of a file which the source code originates from is compared with implicit declaration criteria that may have an associated endian type. The implicit declaration criteria may include, for example, a location of the file where the source code originates from, such as a path name or directory. The implicit declaration criteria may also include a characteristic of a file in the directory, or other information. In this embodiment, the front end unit 220 assigns data in the source code an endian type based on an endianess associated with the implicit declaration criteria. According to a second embodiment of the front end unit 220, data in the source code may be associated with an endian type in the declaration. In this embodiment, the front end unit 120 assigns an endian type to the data based on its associated endian type in the declaration. It should be appreciated that the front end unit 220 may implement both embodiments where an explicit declaration of an endian type to data may take precedence over an endianess associated with an implicit declaration criteria. The data in the source code may include base data types as well as aggregates such as data structures and unions.

The bi-endian capable compiler 200 includes an intermediate language unit 230. The intermediate language unit 230 transforms the abstract syntax tree into a common intermediate form such as an intermediate representation. The bi-endian capable compiler 230 determines where in the intermediate representation to perform endian flip operations and places endian flip operators at those locations. According to an embodiment of the bi-endian capable compiler 200 when data of one endian type is different than the endian type of a target or platform system, endian flips are performed prior to writing the data in memory and after reading the data from the memory of the target or platform system. It should be appreciated that the intermediate language unit 230 may transform the abstract syntax tree into one or more common intermediate forms.

The bi-endian capable compiler 200 includes an optimizer unit 240. The optimizer unit 240 includes a common sub-expression elimination (CSE) unit 241. The CSE unit 241 eliminates redundant endian flip operations and simplifies the intermediate representation when it is determined that a value for data has not changed. The optimizer unit 240 includes a code motion unit 242. The code motion unit 242 moves the endian flip operation to an earlier portion of an instruction stream when it may be more efficient to perform the endian flip operation from a performance standpoint. The optimizer unit 240 includes a constant propagation unit 243. The constant propagation unit 243 eliminates an endian flip operation on a constant when it is determined from constant propagation analysis that a value for data has not changed and thus a read from memory is not necessary.

The bi-endian compiler 200 includes a code generator 250. The code generator 250 converts the intermediate representation into machine code. According to an embodiment of the bi-endian compiler 200, the code generator 250 inserts machine instructions to implement the endian flip operations. In one embodiment, one or more BSWAP and/or shift instructions are used to implement the endian flip operations.

According to an embodiment of the bi-endian compiler 200, operations on big endian data may be decomposed as shown in the example below.

```
extern int x;
extern short y;
x++;
y++;
would translate as:
; x++
    MOV         EAX, x
    BSWAP       EAX
    INC         EAX
    BSWAP       EAX
    MOV         x, EAX
; y++
    MOV         AX, y
    BSWAP       EAX
    SHR         EAX, 16
    INC         EAX
    BSWAP       EAX
    SHR         EAX, 16
    MOV         y, AX
```

The bi-endian compiler 200 includes a register allocator 260. The register allocator 260 identifies data in the intermediate representation that may be stored in registers in the processor rather than in memory. The register allocator 260 allocates registers to data that is of the endian type of the computer system.

Figure 3:
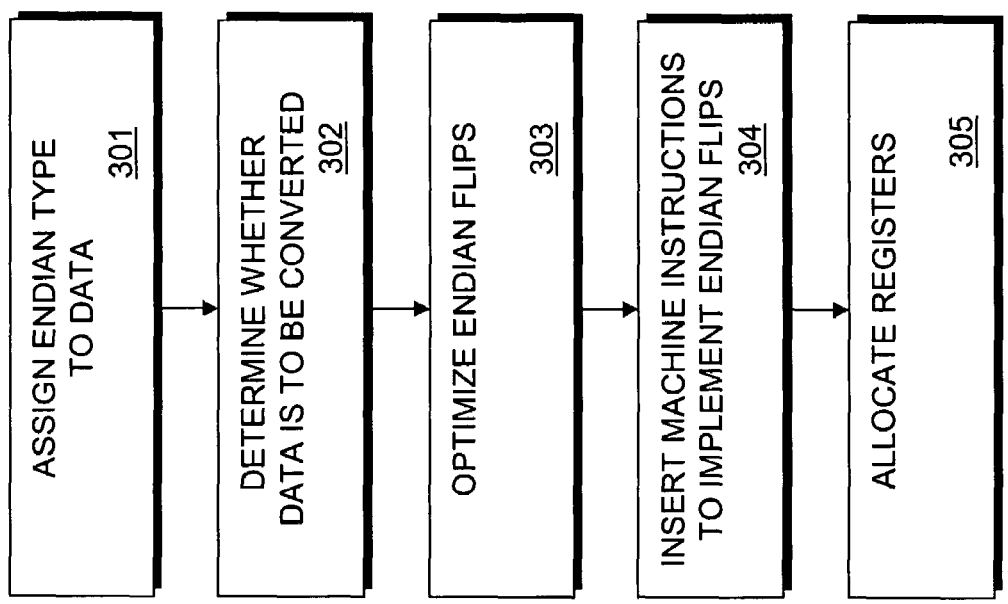
FIG. 3 is a flow chart of a method for facilitating bi-endian support when compiling code according to an example embodiment of the invention.

FIG. 3 is a flow chart of a method for facilitating bi-endian support when compiling code according to an example embodiment of the invention. At 301, an endian type is assigned to data. An endian type may be assigned to data through implicit declarations, explicit declarations, or a combination of implicit and explicit declarations.

At 302, it is determined whether the data is to be converted from one endian type to another. According to an embodiment of the present invention, when data of one endian type is different than the endian type of a target or platform system, an endian flip is performed prior to writing the data in memory and after reading the data from the memory of the target or platform system. Endian flip operators may be placed in locations of an intermediate language where endian flip operations are determined to be performed.

According to an embodiment of the present invention, endian flips are inserted only for data for which there is a possible semantic difference between big- and little-endian representations. This may be determined, for example, by a compiler. In one embodiment, data variables that are not external, volatile, or part of a union, and do not have their addresses explicitly referenced by code are stored in either representation without any semantic effect on the program. Further analysis may be performed to further reduce the class of variables which need endian flips. Endian flips may also be eliminated when the source and destination are the same endian type and the operation is one in which endian representation does not matter, e.g., bitwise boolean operations (and, or, xor, not).

At 303, optimization of the endian flips is performed. Optimization may involve moving or eliminating an endian flip operation in order to reduce processor cycles when executing the code. According to an embodiment of the present invention, optimization may involve eliminating a redundant endian flip operation when it is determined that a value for data has not changed, moving the endian flip operation to an earlier or later portion of an instruction stream when it may be more efficient from a performance standpoint, or performing other procedures.

At 304, machine instructions are inserted into the machine code to implement the endian flip operations. According to an embodiment of the present invention where the endian flip operations flip bytes to support conversion between big endian data and little endian data, one or more BSWAP and/or shift instructions may be used.

At 305, register allocation is performed. According to an embodiment of the present invention, data in the intermediate representation is identified to be stored in registers in a processor rather than in memory.

Figure 4:
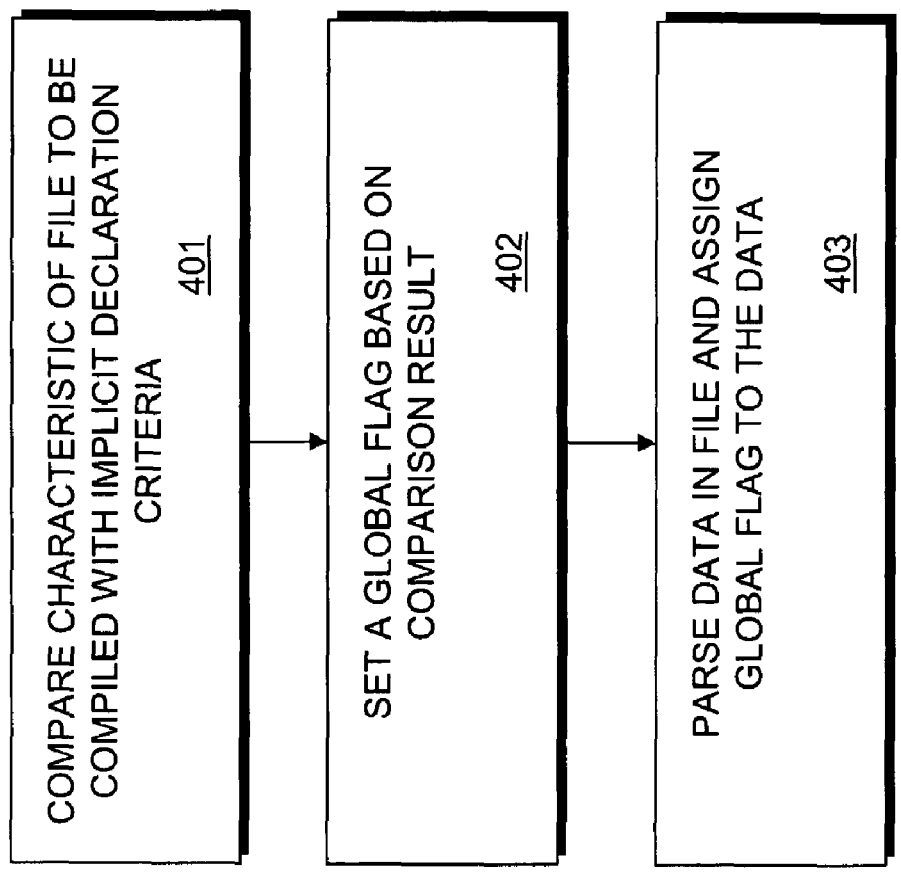
FIG. 4 is a flow chart of a method for assigning endian type to data using implicit declarations according to an example embodiment of the present invention.

FIG. 4 is a flow chart of a method for assigning endian type to data using implicit declarations according to an example embodiment of the present invention. The method shown in FIG. 4 may be implemented at 301 as shown in FIG. 3. At 401, a characteristic of the file of the code to be compiled is compared with an implicit declaration criteria. The implicit declaration criteria may include, for example, a location of the file such as its path or directory name, a characteristic of another file in the directory, or other criteria. The implicit declaration criteria may have an endian type associated with it.

At 402, a global flag for all the data in the code is set based on the comparison at 401. According to an embodiment of the present invention, the global flag may be an indicator to indicate an endian type associated for all data in the code.

At 403, data in the code is parsed and the global flag is assigned to the data in the code.

Implicit declarations as shown in FIG. 4 allow for software written on a first target or platform system utilizing a first endian type to be compiled, linked, or debugged on a second target or platform system utilizing a second endian type without modification to the source code. The embodiment shown in FIG. 4 allows a bi-endian capable compiler to support both big and little endian byte orderings for base data bytes. For example, if the implicit declaration criteria is a path name that is associated with an endian type, all source files within a directory having the path name would be compiled with the associated endian type. Other implicit declaration criteria may be implemented. For example, a name of a file sharing a same directory as a file to be compiled may be used to associate an endian type. According to an embodiment of the present invention, the association of an implicit declaration criteria to an endian type may be made using a command to the compiler upon invocation. According to an alternate embodiment of the present invention, a file that set an endian mode before and reset the endian mode after inclusion of a source file or header file may be automatically included in the association. It should be appreciated that other procedures for association may also be used.

Figure 5:
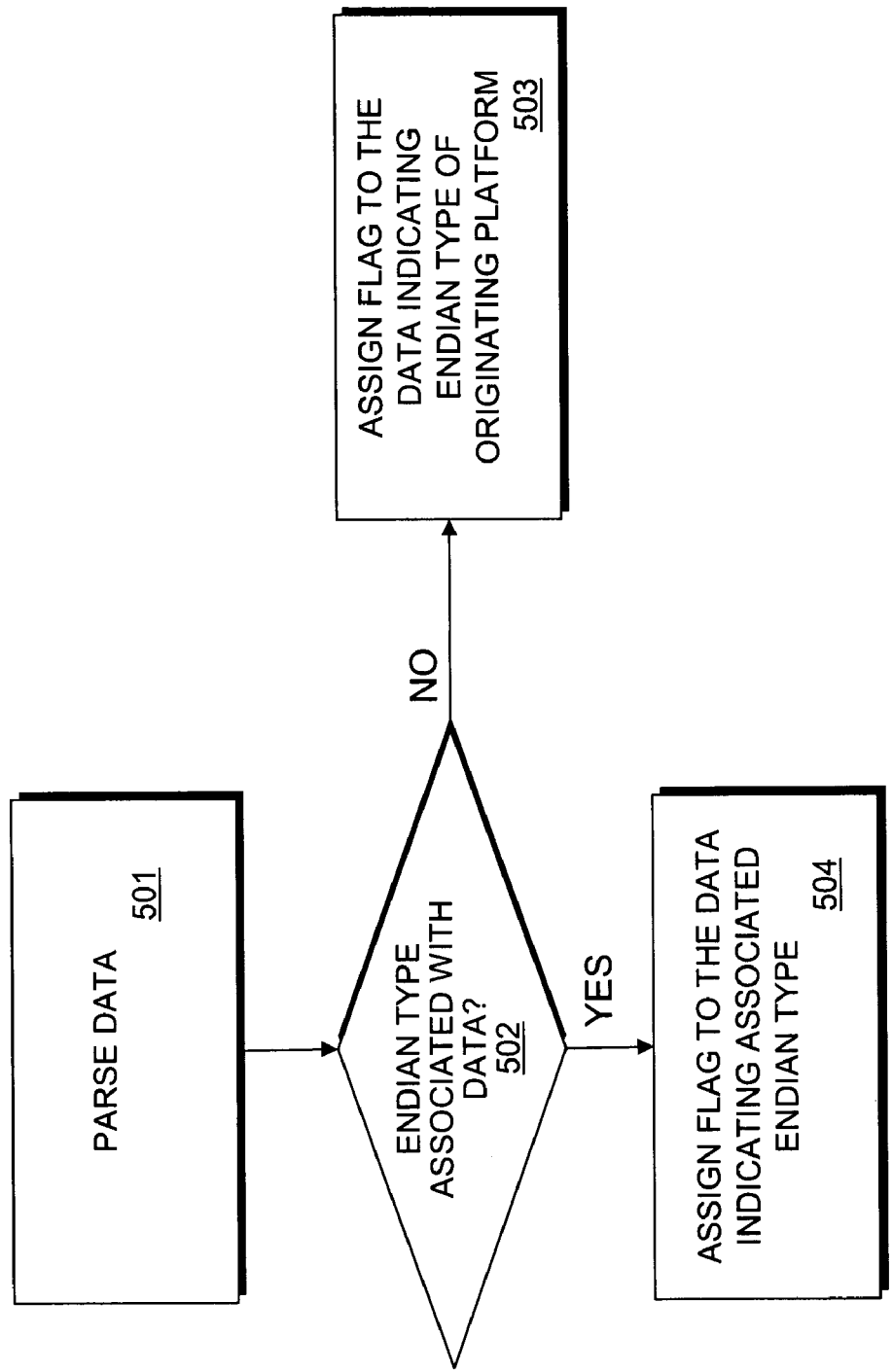
FIG. 5 is a flow chart of a method for assigning endian type to data using explicit declarations according to an example embodiment of the present invention.

FIG. 5 is a flow chart of a method for assigning endian type to data using explicit declarations according to an example embodiment of the present invention. The method shown in FIG. 5 may be implemented at 301 shown in FIG. 3. At 501, data in the code to be compiled is parsed.

At 502, it is determined whether an endian type is associated with the data. According to an embodiment of the present invention, the declaration of the data is checked for type specifiers, attribute qualifiers, or other labels that may indicate an endianess that may be associated with the data. If it is determined that an endian type is not associated with the data, control proceeds to 503. If it is determined that an endian type is associated with the data, control proceeds to 504.

At 503, a flag is assigned to the data to indicate a default endian type. According to an embodiment of the present invention, a flag is assigned to the data to indicate an endian type corresponding to the platform system from which the code originated from, an endian type corresponding to the platform system which the code is to be executed on, or other endian type.

At 504, a flag is assigned to the data to indicate an endian type associated with the data in the declaration.

Explicit declarations as shown in FIG. 5 allow a compiler to simultaneously support and handle big and little endian types with explicit modifications to the source code. Bi-endian support allows the integration of big endian software with little endian software. Instances of base data types such as integers, pointers, floats, and bit fields, may be explicitly qualified as to their endianess by type specifiers, attribute qualifiers, or other labeling techniques. In the absence of an explicit declaration, the endianess of a base data type may be the default of the compiler or other component. Examples of explicit declarations are shown below.

_big endian int i; /*a big endian integer*/ int*_bigendian p; /*a big endian pointer to a default integer*/ struct{_littleendian inta; _bigendian int b} c; /*a bi-endian structure*/ union {_little endian int 1; _bigendian int b} d; /*a bi-endian union*/ int i1_atribute_((bigendian))/*alternate method of explicitly declaring endi attribute*/

Figure 6:
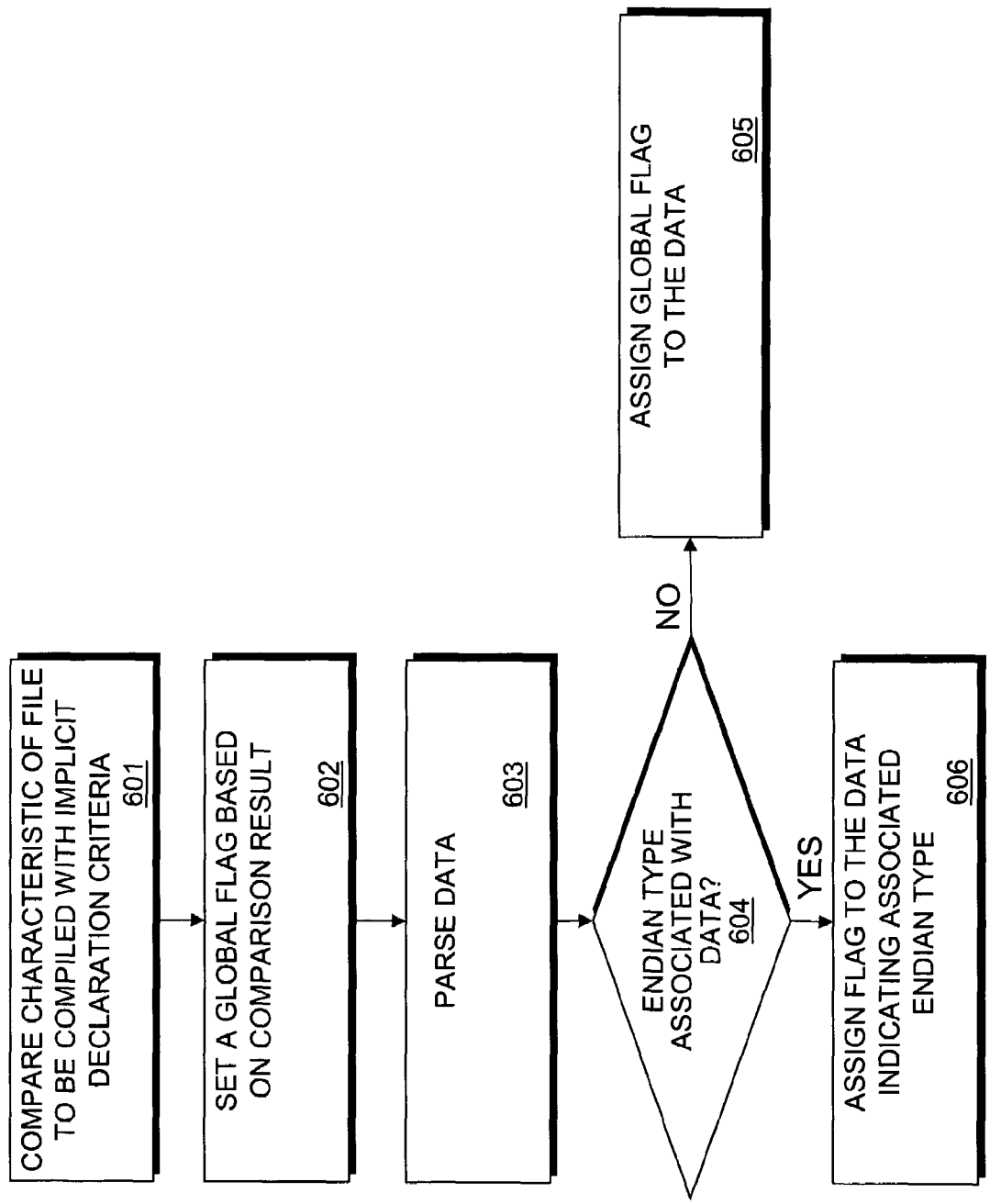
FIG. 6 is a flow chart of a method for assigning endian type to data using implicit and explicit declarations according to an example embodiment of the present invention.

FIG. 6 is a flow chart of a method for assigning endian type to data using implicit and explicit declarations according to an example embodiment of the present invention. The method shown in FIG. 6 may be implemented at 301 shown in FIG. 3. At 601, a characteristic of the file of the code to be compiled is compared with an implicit declaration criteria. The implicit declaration criteria may include, for example, a location of the file such as its path or directory name, or characteristic of another file in the directory. The implicit declaration criteria may have an endian type associated with it.

At 602, a global flag is set based on the comparison as described at 401. According to an embodiment of the present invention, the global flag may be an indicator to indicate an endian type associated for all data in the code.

At 603, data in the code is parsed.

At 604, it is determined whether an endian type is associated with the data. According to an embodiment of the present invention, the declaration of the data is checked for type specifiers, attribute qualifiers, and other labels that may indicate an endianess that may be associated with the data. If it is determined that an endian type is not associated with the data, control proceeds to 605. If it is determined that an endian type is associated with the data, control proceeds to 606.

At 605, the global flag is assigned to the data in the code.

At 606, a flag is assigned to the data to indicate an endian type associated with the data in the declaration. A second flag may also be assigned to the data to indicate that the endian type is determined explicitly.

FIGS. 3 through 6 are flow charts illustrating methods according to embodiments of the present invention. Some of the techniques and procedures illustrated in these figures may be performed sequentially, in parallel, or in an order other than which is described. It should be appreciated that not all of the techniques and procedures described are required to be performed, that additional techniques and procedures may be added, and that some of the illustrated techniques and procedures may be substituted with other techniques and procedures.

Figure 7:
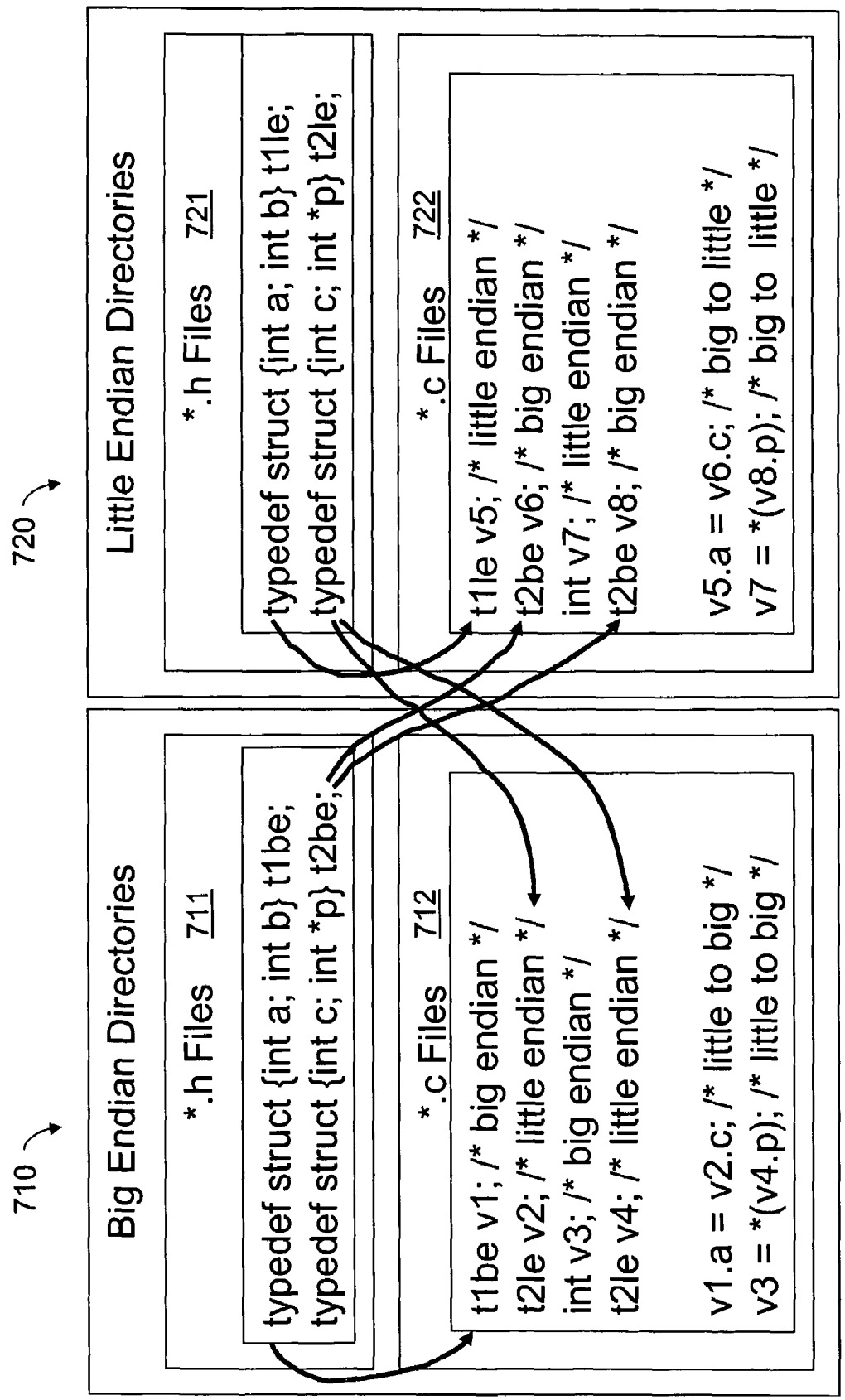
FIG. 7 illustrates an example of associating endian type to data using implicit declarations according to an embodiment of the present invention.

FIG. 7 illustrates an example of associating endian type to data using implicit declarations according to an embodiment of the present invention. In this example, the implicit declaration criteria is the location of the code to be compiled. Location 710 is associated with files that are big endian. Location 720 is associated with files that are little endian. Location 710 includes a .h file 711 that defines data structures t1*be* and t2*be*. Since both of these data structures are defined in a .h file that is in a location that has a big endian type association, both data structures t1*be* and t2*be* are assigned an endian type of big endian. Location 720 includes a .h file 721 that defines data structures t1*le* and t2*le*. Since both of these data structures are defined in a .h file that is in a location that has a little endian type association, both data structures t1*le* and t2*le* are assigned an endian type of big endian.

Location 710 includes a .c file 712 that declares variables and their corresponding data structures, if any. Variables v1 and v3 are big endian. Variables v2 and v4 are little endian. Location 720 includes a .c file 722 that declares variables and their corresponding data structures, if any. Variables v5 and v8 are little endian. Variables v6 and v8 are big endian.

With reference to .c file 712, note that when variable v1 which is big endian is set to v2 which is little endian, variable v2 is converted from little endian to big endian. When variable v3 which is big endian is set to v4 which is little endian, variable v4 is also converted from little endian to big endian.

With reference to .c file 722, note that when variable v5 which is little endian is set to v6 which is big endian, variable v6 is converted from big endian to little endian. When variable v7 which is little endian is set to v8 which is big endian, variable v8 is also converted from big endian to little endian.

Embodiments of the present invention may be provided as a computer program product, or software, that may include a machine-readable medium having stored thereon instructions. The machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The term "machine readable medium" used herein shall include any medium that is capable of storing or encoding a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A computer implemented method of compiling source code, comprising:
   assigning an endian type to data in source code;
   converting the source code to an abstract syntax tree;
   transforming the abstract syntax tree into an intermediate representation;
   converting the intermediate representation to machine code; and
   inserting machine instructions to perform an endian flip operation based on the endian type of the data and a target system when the machine instructions are executed by a processor in the target system.

2. The method of claim 1, further comprising determining the endian type of the data from a declaration of the data in the source code.

3. The method of claim 1, further comprising determining the endian type of the data based on implicit declaration criteria.

4. The method of claim 3, wherein the implicit declaration criteria comprises a location of a file where the source code originates.

5. The method of claim 3, wherein the implicit declaration criteria comprises a characteristic of a file in a directory with the source code.

6. The method of claim 1, wherein swapping bytes corresponding to the data is performed prior to writing the data in memory and after reading the data from the memory.

7. The method of claim 1, further comprising eliminating a redundant endian flip operation upon determining a presence of a common sub-expression when a value for data is unchanged.

8. The method of claim 1, further comprising moving the endian flip operation to an earlier portion of an instruction stream.

9. An article of manufacture comprising a machine accessible storage medium including sequences of instructions, the sequences of instructions including instructions which when executed cause the machine to perform:
assigning an endian type to data in source code; and
performing an endian flip operation based on the endian type of the data and a target system.

10. The article of manufacture of claim 9, further comprising instructions which when executed causes the machine to further perform determining the endian type of the data from a declaration of the data in source code.

11. The article of manufacture of claim 9, further comprising instructions which when executed causes the machine to further perform determining the endian type of the data based on implicit declaration criteria.

12. The article of manufacture of claim 9, wherein performing the endian flip operation comprises swapping bytes corresponding to the data.

13. The article of manufacture of claim 12, wherein swapping bytes corresponding to the data is performed prior to writing the data in memory and after reading the data from the memory.

14. The article of manufacture of claim 12, wherein swapping bytes comprises inserting one or more machine instructions in machine code.

15. A computer system, comprising:
a memory; and
a processor to implement a compiler having a front end unit to assign an endian type to data in source code, and a intermediate language unit to determine when to perform an endian flip operation based on the endian type of the data and an endian type of a target system.

16. The computer system of claim 15, wherein the front end unit determines the endian type of the data from a declaration of the data in source code.

17. The computer system of claim 15, wherein the front end unit determines the endian type of the data based on implicit declaration criteria.

18. The computer system of claim 15, wherein the compiler further comprises a code generator unit to insert one or more machine instructions to enable the endian flip operation.

19. The computer system of claim 15, wherein the compiler further comprises an optimizer unit to eliminate an endian flip operation upon determining a presence of a common subexpression.

20. The computer system of claim 15, wherein the compiler further comprises an optimizer unit to move an endian flip operation to an earlier portion of an instruction stream.

* * * * *